May 18, 1954  M. R. BLACK  2,678,557
AUTOMATIC PRESSURE MORTAR TROWEL

Filed Dec. 22, 1948  2 Sheets-Sheet 1

M. R. Black
INVENTOR

BY C. A. Snow & Co.
ATTORNEYS.

May 18, 1954  M. R. BLACK  2,678,557
AUTOMATIC PRESSURE MORTAR TROWEL
Filed Dec. 22, 1948  2 Sheets-Sheet 2
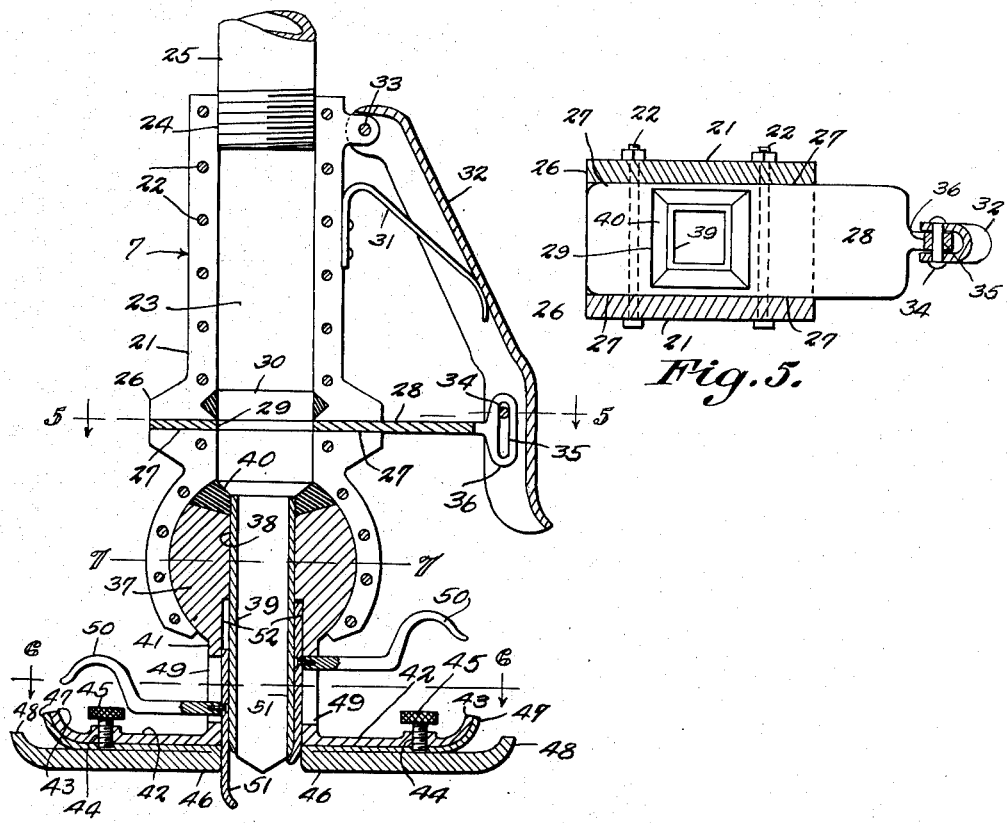
Fig.5.
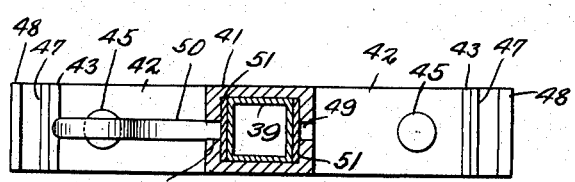
Fig.4.
Fig.6.
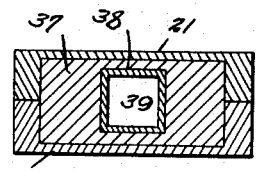
Fig.7.
M. R. Black
INVENTOR
BY Cadnow &Co.
ATTORNEYS.

Patented May 18, 1954

2,678,557

UNITED STATES PATENT OFFICE 2,678,557

AUTOMATIC PRESSURE MORTAR TROWEL

Marion R. Black, Mount Morris, N. Y.

Application December 22, 1948, Serial No. 66,680

1 Claim. (Cl. 72—130)

This invention relates to an automatic pressure mortar trowel. More particularly, the invention has reference to a trowel construction including a tank in which mortar is kept under pressure, to be fed through a supply hose to a trowel of novel design, said trowel being so designed as to permit discharge of mortar therethrough under the full control of the operator.

An important object of the present invention is to provide a trowel construction permitting the laying of concrete blocks and the like by both experienced and inexperienced help, and at greater speed and with greater savings of material, the construction of the pressure tank and trowel being so designed as to make full use of all mortar, with said mortar being always available at the smoothing blade of the trowel, and without any loss of mortar such as would tend to occur in conventional block laying operations.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 4 is a vertical section through the trowel.

Figure 5 is a section through the trowel on line 5—5 of Fig. 4.

Figure 6 is a section through the trowel on line 6—6 of Fig. 4.

Figure 7 is a section through the trowel on line 7—7 of Fig. 4.

Figure 1:
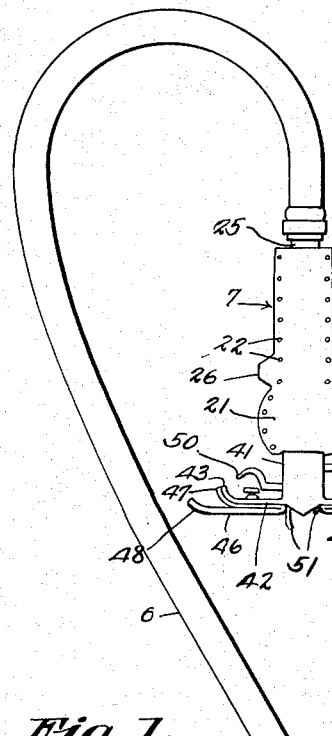
Figure 1 is a side elevational view of a pressure tank and mortar trowel constructed in accordance with the invention.
Figure 2:
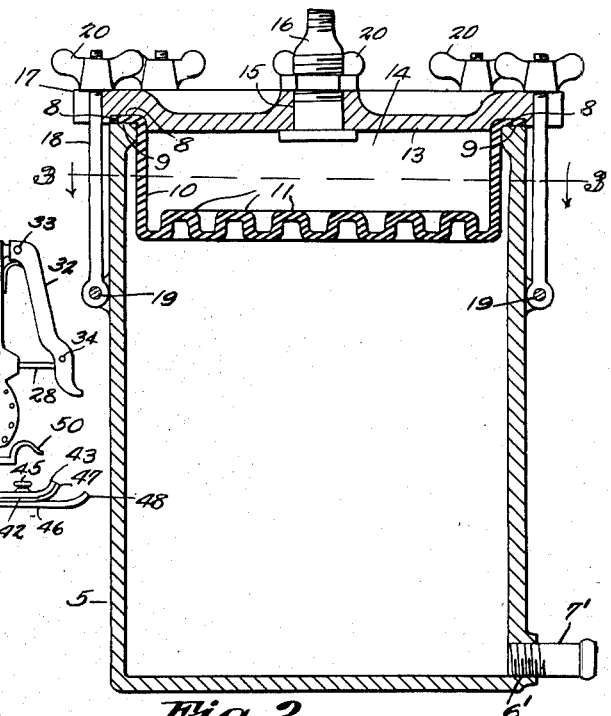
Figure 2 is a vertical section through the tank.
Figure 3:
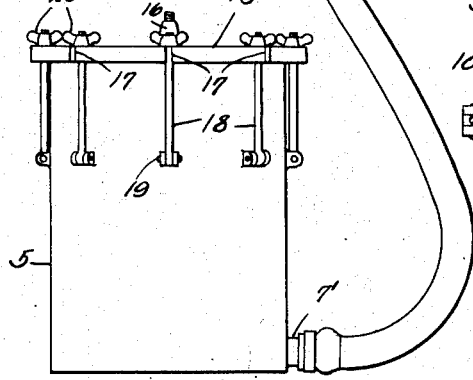
Figure 3 is a section through the tank, taken on line 3—3 of Fig. 2.
Figure 3:
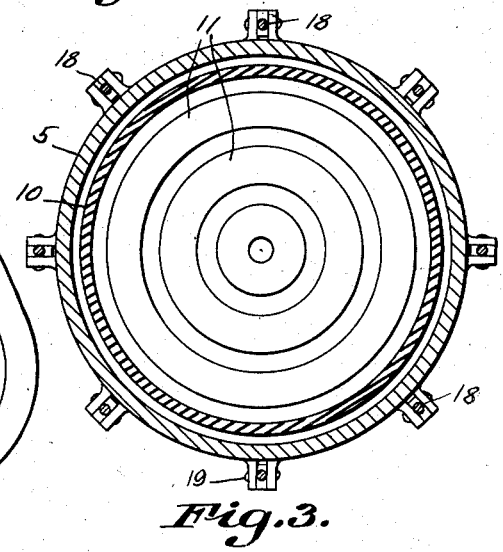

Referring to the drawings in detail, the invention in its broadest aspects embodies a pressure tank 5 in which the mortar is deposited, said pressure tank being adapted to force the mortar under pressure through a supply hose 6 of suitable length, that is connected to the trowel generally designated 7.

The tank 5 might be of various shapes, being here illustrated as cylindrical with one end formed open and adapted to receive a diaphragm and removable lid to be described. At the opposite end of the tank 5, there is formed therein a threaded opening 6', in which is threaded the fitting 7', adapted for coupling to the hose 6.

The open end of the tank 5 is flanged inwardly to provide a wide peripheral bearing surface 8 for the outwardly extended marginal portion 9 of an expandable member 10 here shown as comprising a diaphragm, said expandable member 10 in the present instance being formed with the annular corrugations 11. This defines between the diaphragm and the lid 13 an expansion chamber 14.

Formed centrally in the lid 13 is the threaded opening 15 in which is adapted to be secured the adaptor 16, threaded for connection to a coupling, not shown, whereby to provide communication between the expansion chamber 14 and a hose for supplying fluid pressure, such as compressed air.

It will thus be seen that an air compressor of conventional design can be coupled into communication with the expansion chamber 14, and when air is forced into said chamber under pressure, the diaphragm will expand, and mortar contained within the tank 5 will as a result be forced under pressure through the hose 6 to the trowel 7.

The expansion chamber 14 must of course be leak-proof, and to this end, there is provided in the present instance a clamp means for clamping the lid tightly upon the tank, with the peripheral edge 9 of the diaphragm being engaged between the marginal portion of the lid and the upper end 8 of the tank.

To this end, a plurality of radial slots 17 are formed in the marginal portion of the lid and are spaced circumferentially thereof. These receive the upper end of bolt 18 pivotally connected at 19 to the tank wall for swinging radially of said wall. Wing nuts 20 threadable on said bolts force the lid 13 downwardly against the periphery of the diaphragm, thus to seal tightly the expansion chamber 14.

It may be noted that although this construction defines an expansion chamber in the tank, which on expansion forces the mortar in the tank through the outlet 6', nevertheless, it is a simple matter to replenish the tank as necessary, since the wing nuts 20 are readily loosened, whereupon the bolts 18 are swung outwardly, permitting removal of the lid and diaphragm for replenishing the mortar in the tank. The peripheral edge of the diaphragm can be adhesively or otherwise secured to the marginal portion of the lid, so that they are removable as a single unit.

Referring now to the construction of the trowel proper, this is preferably formed compositely, from a pair of casing sections 21 joined along their opposed longitudinal edges by fastening means 22. There is thus provided a trowel casing, through which the mortar forced under pressure through the supply hose 6 is adapted to be fed.

At the upper or inlet end of the trowel casing, the sections 21 have their inner surfaces respectively formed with grooves square in cross section, to provide a cross sectionally squared bore 23. At the inlet end of said bore, the bore is formed circular and is internally threaded at 24 for receiving the threaded coupling 25 connected to the hose 6.

Intermediate the ends of the trowel casing, the casing sections 21 are thickened as at 26 and slotted inwardly as at 27 to provide a trackway for the slide valve 28 formed intermediate its ends with the squared opening 29 adapted to register with bore 23. A rubber gasket 30 set into the walls of the bore adjacent the slide valve prevents leakage of the mortar through the slots 27.

The valve is normally held open, that is, with its opening 29 in registry with the bore 23, but the size of the opening can be adjusted as the mortar is used. To this end, there is provided a leaf spring 31, and this normally presses outwardly from the trowel the trigger 32 pivoted at 33 to the casing, and having the cross pin 34 extending through the slot 35 formed in one end of the slide valve 28.

By reason of this construction, it may be noted that in the use of the trowel, the user's hand automatically covers the trigger 32, as the mortar is spread. Accordingly, it is under the full control of the user to adjust the quantity of mortar fed through the trowel, by pressing trigger 32 inwardly as necessary for the purpose of constricting the valve opening. Additionally, the flow can be either started or stopped altogether by bringing the valve opening in registry with the bore or completely out of registry, as the case may be.

I provide in my trowel a smoothing blade unit that depends from the casing, and is mounted for swinging movement relative to the casing. This includes at its upper end the block 37, having arcuate outer surfaces in sliding contact with the correspondingly incurved inner surfaces of the lower ends of the casing sections 21. Thus, a pivotal or rocking connection of the blade unit to the casing is provided, that permits said blade portion to swing in either direction relative to the casing, that is, to the right or left in Fig. 4.

The block 37 is formed with a cross sectionally squared bore in communication with the bore 23, and this bore is designated 38. A lining member 39 is preferably provided, the lining member 39 projecting below the block 37.

For the purpose of preventing leakage through the connection between the block and the casing, there is provided the gasket 40 of suitable material.

Integral with the block 37, and depending therefrom is the tubular extension 41, through which the lining member 39 extends, and said tubular extension is formed integral at its lower end with oppositely extended guide plates 42 having the upturned ends 43.

Formed in the respective guide plates 42 are the threaded openings 44, receiving the adjusting screws 45, said adjusting screws being adapted for adjustment toward and away from the guide plates of the smoothing blades 46. Smoothing blades 46 are each formed from suitable material folded upon itself and of springable characteristics, so that on threading of the adjusting screws 45 away from said smoothing blades, the smoothing blades will spring back into engagement with the guide plates 42. The adjusting screws 45 permit a fine adjustment of the angular position of the smoothing blade or plate 46 relative to the guide plates 42 and the axis of the delivery outlet.

One end of each smoothing blade is upturned as at 47 and is formed correspondingly to and engages the upturned end 43 of the adjacent guide plate 42. The other end of each smoothing blade is also upturned as at 48, but is spaced a greater distance from the center of the device, than is the end 47.

Diametrically opposed longitudinal slots 49 are formed in the tubular extension 41, and riding in these slots are the triggers 50, each trigger controlling the flow of mortar, by connection of the trigger to a mortar retaining blade 51, that slides in slot 52 defined between the block 37 and the lining member 39.

In use, the tank is filled with a suitable supply of mortar, and air is fed into the expansion chamber 14. A check valve can readily be embodied in the fitting 16, to prevent said air from leaving the chamber after having been forced therein. Periodically, air is forced into the expansion chamber as necessary to keep the mortar in the tank under pressure sufficient for it to be ejected forcibly through the trowel casing, when slide valve 28 is open.

The user adjusts one or the other of the mortar retaining blades 51, depending on which direction flow of mortar out of the bottom of the trowel is to be prevented. As a result, on operation of the trigger 32, mortar is fed through the trowel under pressure, and on being forced from the lower end thereof, will be forced under the smoothing blade 46 opposing the particular mortar retainer blade in use. In other words, and considering Fig. 4 for example, the blade retainer on the left is in use, and accordingly, mortar forced out of the trowel will be forced to the right, under the smoothing blade 46 disposed at the right in Fig. 4 at the maximum thickness determined by the adjustment of the screw 45 and restricted from movement under the smoothing blade 46 on the left.

The guide plate 42, having the outturned end, meantime serves to guide the trowel in a straight line, thus providing a wall guide.

As necessary, the user can adjust the mortar retainer blade for the depth of the layer of mortar to be deposited on the concrete blocks being laid. In this connection, the invention is particularly adapted for laying concrete blocks and the like, and permits laying of said blocks by one having little experience or skill along this line, the invention yet permitting the blocks to be laid with great rapidity and ease.

What is claimed is:

In a fountain trowel an elongated blade unit having a longitudinal bore extending therethrough, laterally extending guide plates carried by the blade unit adjacent one end thereof, blade adjusting screws extending through and threadedly engaging the guide plates remote from the bore, resilient smoothing blades attached adjacent one edge to the guide plates adjacent the bore and extending beneath the adjusting screws for movement by said screws from a position parallel with the plates to angular positions relative to the plates, mortar retaining and directing blades mounted on the blade unit to slide longitudinally thereof between the guide plates and the bore for directing mortar delivered through the bore toward a selected smoothing blade, said blade unit having peripherally spaced elongated longitudinal slots extending therethrough adjacent the mortar retaining and directing blades, and triggers carried by the mortar retaining blades and extending laterally therefrom through the slots for governing the movements of the mortar retaining blades.

References Cited in the file of this patent

UNITED STATES PATENTS

| Number | Name | Date |
|---|---|---|
| 760,027 | Selley | May 17, 1904 |
| 1,085,566 | Glover | Jan. 27, 1914 |
| 1,306,830 | Moore | June 17, 1919 |
| 1,399,849 | Chapin | Dec. 13, 1921 |
| 1,471,091 | Bessesen | Oct. 16, 1923 |
| 2,104,086 | Lines | Jan. 4, 1938 |
| 2,105,160 | Piquerez | Jan. 11, 1938 |
| 2,220,119 | Pasanen | Nov. 5, 1940 |
| 2,236,737 | Stone | Apr. 1, 1941 |
| 2,413,684 | Ames | Jan. 7, 1947 |
| 2,436,783 | Ames | Mar. 2, 1948 |